Figure 1:
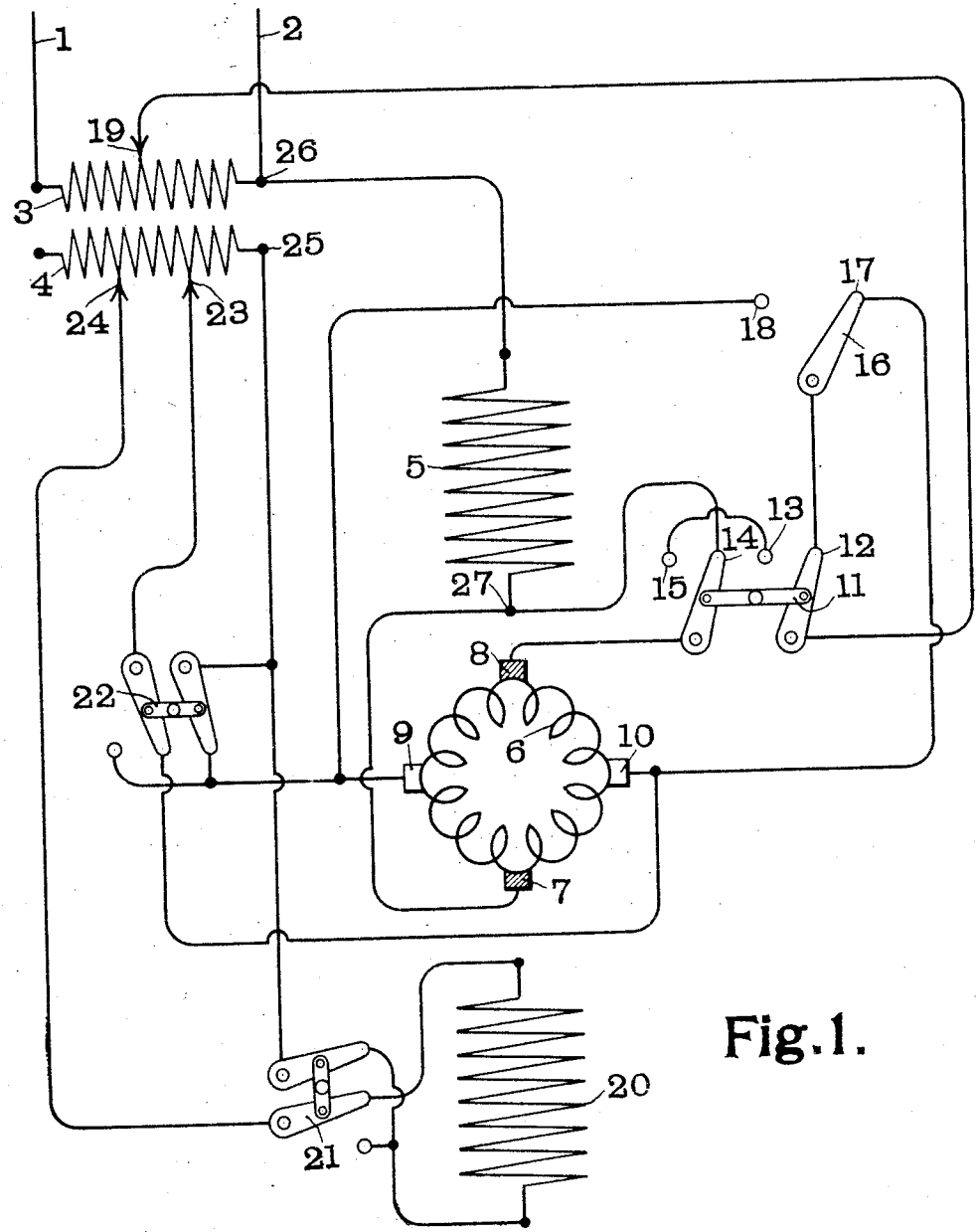

V. A. FYNN.
ALTERNATING CURRENT MOTOR.
APPLICATION FILED JUNE 12, 1909.

957,505.

Patented May 10, 1910.
2 SHEETS—SHEET 1.

WITNESSES:
L. L. Mead.
W. H. Alexander.

INVENTOR
Valère A. Fynn
BY
Fowler & Huffman
ATTORNEY

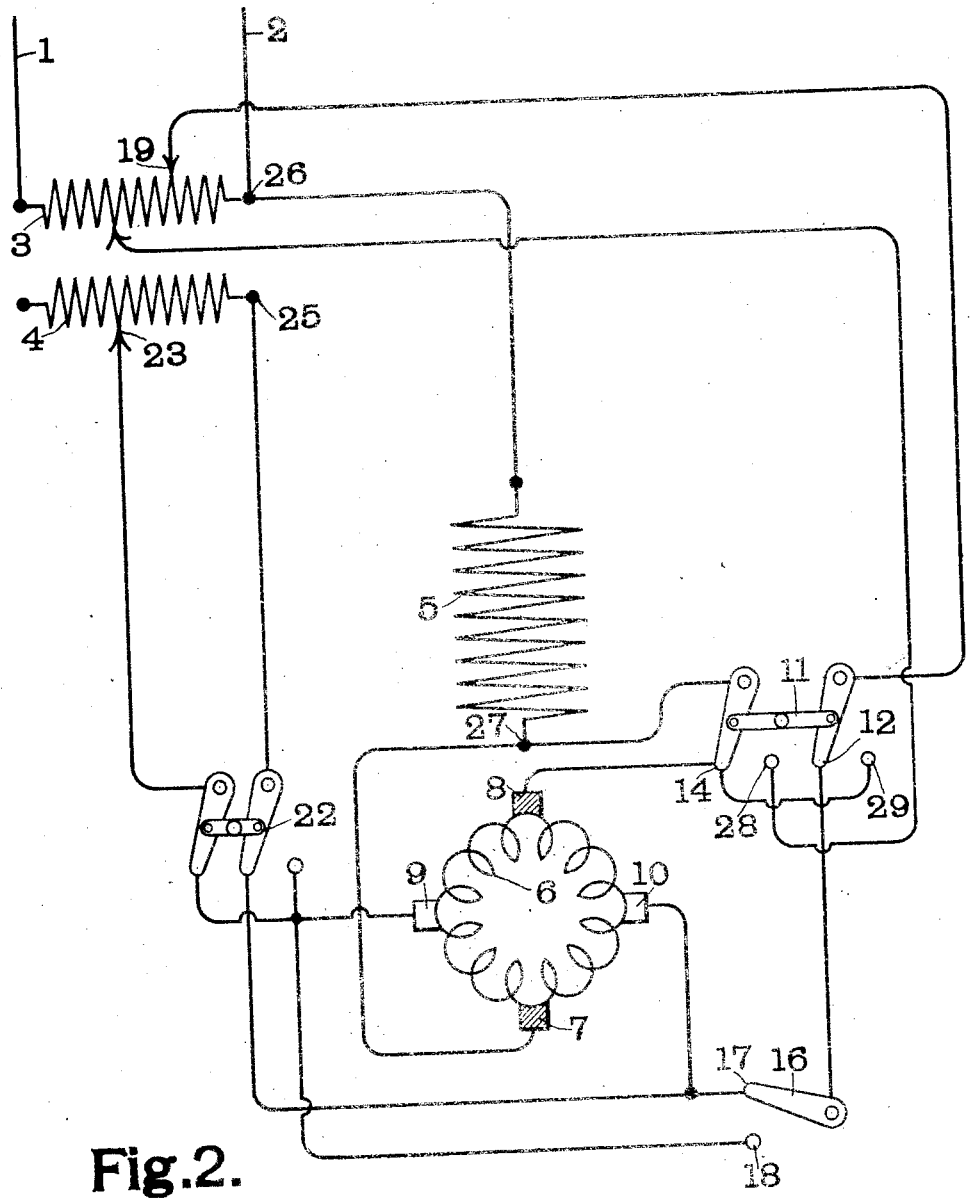

UNITED STATES PATENT OFFICE.

VALÈRE ALFRED FYNN, OF LONDON, ENGLAND.

ALTERNATING-CURRENT MOTOR.

957,505.  Specification of Letters Patent.  Patented May 10, 1910.

Application filed June 12, 1909. Serial No. 501,691.

*To all whom it may concern:*

Be it known that I, VALÈRE ALFRED FYNN, a subject of the King of England, residing at London, England, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to an improved means of starting the type of self-excited conduction motors having a shunt characteristic which I have disclosed in my prior applications Serial Nos. 481,766 and 481,763, filed March 6, 1909.

The object of this invention is to enable such machines to be started with a powerful torque by means of a simple alteration in the connections and without necessitating the use of stator windings disposed along the motor field axis thus greatly simplifying the construction of such machines.

In the accompanying diagrammatic drawings, Figure 1 shows the invention as applied to a machine which has a teaser winding independent of the neutralizing winding, whereas Fig. 2 shows the invention as applied to a motor in which the neutralizing and the teaser winding are combined into one.

In carrying out my invention I so alter the working connections as to short-circuit the rotor along the axis of the neutralizing winding without disconnecting it from the neutralizing winding and so as to convey a current from the mains through the neutralizing winding to all of the short-circuited brushes and from the latter through part of the commuted rotor winding and back to the mains. The machine will thus start as a separately excited series induction motor, the neutralizing winding acting as a transformer or primary working winding, the short-circuited commuted winding as the secondary working winding and that part of the commuted winding through which the current is conducted as a field or exciting winding. Conducting the current through one part of the commuted winding will cause the motor to start in one direction and conducting it through the other part will reverse the direction of rotation. The teaser winding may be connected to the mains at starting or only after a sufficient speed has been reached. After a sufficient speed has been reached the connections are changed to those prescribed for normal operation.

Referring to Fig. 1, the mains 1, 2 are connected to the primary 3 of a transformer. This primary feeds the working circuit of the motor. At starting switch 11 stands on points 12, 14 as shown. Point 26 is connected to the neutralizing winding 5. The commuted rotor winding 6 is short-circuited at 14 by switch 11 and the brushes 7, 8. If switch 16 stands on point 17 then the current from 3 can flow through 5 to the brushes 7, 8 and thence through only one half of the commuted winding 6 to brush 10, switches 16, 11 and back to 3 by way of the movable contact 19. Thus 5 induces the secondary working current in 6, this current closing by way of the brushes 7, 8 and flowing through the whole of the commuted winding; the primary current flowing through one half of the commuted winding produces the motor flux along 9, 10 responsible for the torque in conjunction with the secondary working current. The direction of this motor flux and hence the direction of the torque is reversed when 16 stands on 18 for then the primary current flows from 5 to brushes 7, 8 and thence to brush 9 and back to 3. The magnitude of the torque can be controlled by varying at 19 the E. M. F. impressed on 5 and 6 in the manner described. It is preferred to leave switches 22 and 21 open at starting. When the motor has reached a sufficient speed, switch 11 is thrown on to points 13, 15 and switches 21 and 22 are closed in the correct direction thus converting the motor into a compensated self-excited conduction machine with a shunt characteristic. Winding 20 which is fed from the secondary 4 is the teaser winding responsible for the teaser flux and indirectly controlling the phase and magnitude of the motor field. The movable contact 23 controls the magnitude of the compensating E. M. F. derived from 4 and introduced into the exciting circuit.

In Fig. 2 the mains 1, 2 are connected to the primary 3 of a transformer feeding the working circuit of the motor. At starting switch 22 is preferably open, switch 11 stands as shown and switch 16 stands on 17 or 18 according to the desired direction of rotation. It is seen at a glance that the starting conditions are identical with those more particularly described in connection with Fig. 1. When up to speed switch 11 is thrown on to points 28, 29 and switch 22 is closed in the one or the other direction, according to the direction of rotation. The machine is thus converted into a compensated self-excited, conduction motor with a shunt characteristic in which the teaser and the neutralizing windings are combined into one. The E. M. F. derived from 4 and introduced into the exciting circuit is the compensating E. M. F.

It will be seen that the present invention makes it possible among other things to build a self-starting, compensated variable speed, self-excited conduction motor with a shunt characteristic with but one winding on the stator.

Having fully described my invention, what I claim as new and desire to secure by Letters Patent of the United States is:

In an alternating current motor, the combination with a stationary member provided with a neutralizing winding, of a rotor provided with a commuted winding connected in series relation to the neutralizing winding by means of working brushes coaxially disposed with reference to said neutralizing winding, means for short-circuiting the working brushes at starting, an exciting circuit for normal operation provided by closing the circuit of the commuted winding by means of exciting brushes, and means for connecting one of the exciting brushes to the source of supply at starting.

In testimony whereof I have hereunto set my hand and affixed my seal in the presence of the two subscribing witnesses.

VALÈRE ALFRED FYNN. [L. S.]

Witnesses:
ELIZABETH BAILEY,
E. L. HUFFMAN.